Sept. 4, 1945.  F. G. TRITT  2,384,056
MANDREL
Original Filed March 19, 1941
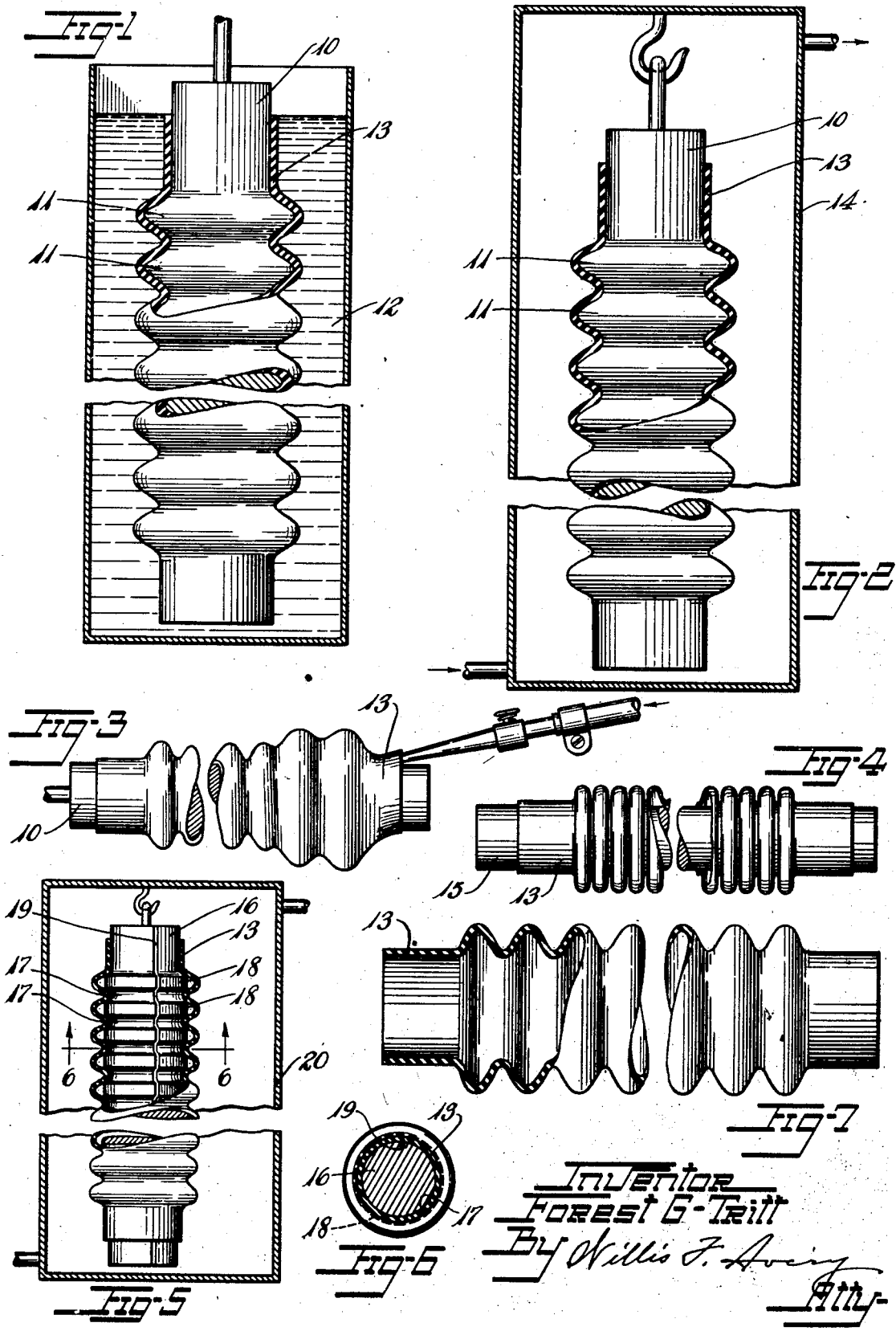

Patented Sept. 4, 1945

2,384,056

UNITED STATES PATENT OFFICE 2,384,056

MANDREL

Forest G. Tritt, Sherman, Ohio, assignor to The B. F. Goodrich Company, New York, N. Y., a corporation of New York Original application March 19, 1941, Serial No. 384,124. Divided and this application January 29, 1943, Serial No. 473,955

3 Claims. (Cl. 18—45)

This invention relates to the manufacture of corrugated tubing of rubber or similar material, such as the corrugated flexible tubing used for breathing tubes in gas mask assemblies. Such tubing customarily is made of rubber or similar flexible material and has relatively thin walls, the necessary resistance to collapse being obtained by molding the walls with a series of circumferential corrugations arranged in closely spaced relation. In longitudinal cross section the wall of such a tube has a generally sinuous outline in the corrugated zone. Such corrugated tubing has been made heretofore by conventional molding processes. Attempts have been made to utilize dipping methods in producing corrugated tubing but such attempts have met with failure principally because of difficulty in obtaining uniform wall thicknesses and uniformly sinuous corrugations due to the tendency of liquid rubber compositions to bridge over and close the closely spaced corrugations. The present invention aims to provide a simple, economical, and efficient procedure for manufacturing corrugated tubing directly from liquid rubber compositions by means of dipping processes without the disadvantages and difficulties which have been encountered in prior efforts.

This application is a division of my copending application, Serial No. 384,124, filed March 19, 1941, and is directed more particularly to a special mandrel utilized in practicing the procedure claimed in the aforesaid copending application.

The invention may be readily understood from the following detailed description of a preferred embodiment as illustrated in the accompanying drawing.

Of the drawing:

Fig. 1 is a sectional elevation illustrating an early step in the manufacturing process and showing a deposition form immersed in a liquid rubber composition with a deposit of rubber on the form;

Fig. 2 is a sectional elevation showing the form of Fig. 1 together with the rubber deposit suspended in an oven for preliminary drying of the deposit;

Fig. 3 is an elevational view illustrating the step of removing the rubber deposit from the deposition form;

Fig. 4 is an elevational view showing the rubber deposit after it has been transferred to a drying mandrel for further drying;

Fig. 5 is a sectional elevation showing the same rubber deposit after it has been transferred to a final shaping mandrel, the shaping mandrel together with the rubber deposit being suspended in a vulcanizing chamber;

Fig. 6 is a vertical section taken on line 6—6 of Fig. 5;

Fig. 7 is an elevational view showing a finished section of corrugated tubing made in accordance with the present invention, a portion of the tube being broken away and sectioned for clarity of illustration.

In manufacturing corrugated tubing according to the preferred embodiment of the invention illustrated in the drawing, I first provide a deposition form 10 which may be made of any suitable non-corrodible material such as aluminum, glass, porcelain, wood or the like. The deposition form 10 ordinarily will consist of a cylindrical member provided through a major portion of its length with circumferential ridges 11—11 adapted to form corrugations in the tubing. The ridges 11—11 correspond generally to the corrugated configuration desired in the tubing but the ridges are spaced more widely than the desired spacing of corrugations in the finished tubing, the contours of the ridges being correspondingly altered to provide a smooth, sinuous surface. No particular spacing of the circumferential ridges 11—11 is essential to the invention so long as the spacing is great enough to permit deposition of the desired thickness of rubber on the form without bridging across between the ridges. Obviously such spacing will vary with the thickness of rubber being deposited and must be determined in each particular case. In the case of rubber deposits having a final, dried thickness of about $\frac{3}{32}$ inch as hereinafter described, corresponding portions of adjacent ridges on the dipping form should be separated by a distance of the order of $\frac{18}{32}$ inch.

The deposition form 10 is immersed in a liquid rubber composition 12 (Fig. 1) and a coating deposit of unvulcanized rubber 13 is produced on the form by any common method. Preferably however, the liquid rubber composition should be a suitably compounded aqueous dispersion of rubber such as a compounded natural rubber latex. Also, the deposition of the rubber from such latex preferably should be accomplished with the aid of a coagulant preliminarily applied to the form as described in U. S. P. No. 1,908,719, the coagulant preferably but not necessarily having associated with it a finely divided powdery material to prevent blemishes and assist in stripping the rubber from the form as described in U. S. P. No. 1,924,214. The initial deposit of latex rubber on the form ordinarily will have about twice the thickness of the final dried deposit due to the presence of water in the initial deposit. Breathing tubes for gas masks customarily have a wall thickness of about $\frac{3}{32}$ inch so that an initial latex rubber deposit for such tubing should be about $\frac{1}{16}$ inch thick in the wet or undried state. It is this relatively great initial thickness of the deposit which makes it impossible to utilize a deposition form having closely spaced corrugation forming ridges corresponding to the desired final spacing of the corrugations.

The deposition form 10 together with the rubber deposit 13 is next placed in any conventional drying means such as the oven 14 illustrated diagrammatically in the drawing (Fig. 2) and the rubber is preliminarily dried at least to an extent sufficient to permit handling of the deposit without unduly distorting it. Ordinarily, drying from 4 to 5 hours in hot air at 140° F. will suffice. Alternatively, drying for 12 hours at room temperature will be satisfactory. After such drying, and preferably before the rubber deposit is completely dried, the deposit is stripped from the dipping form in the usual manner. Such stripping may be facilitated by introducing compressed air between the deposit and the form as illustrated in Fig. 3. It will also usually be desirable to surround the deposit with a cylindrical guard spaced only slightly therefrom to limit the inflation of the deposit. The closed end of the deposit may be trimmed off at any convenient stage before or after the deposit is stripped from the form.

After the partially dried deposit is removed from the dipping form, it is transferred to a drying mandrel 15 (Fig. 4) which preferably has a smooth cylindrical surface corresponding in diameter to the inner diameter of the tubing. The deposit is then contracted lengthwise on the drying mandrel to bring the corrugations into more closely spaced relation and preferably to bring them into closer relation than is desired in the finished tubing. While the deposit is maintained with the corrugations in such closely spaced relation, the deposit is further dried preferably until it is substantially completely dry. Usually, additional drying at this stage for 24 hours in hot air at 140° F. will be adequate.

The completely dried deposit 13 next is transferred to a shaping mandrel 16 (Figs. 5 and 6). The shaping mandrel 16 preferably comprises a cylindrical member having a diameter corresponding to the inner diameter of the tubing. The shaping mandrel 16 is provided with a series of spaced apart circumferential grooves 17—17 having gently curved bottoms corresponding to the curvature desired in the valleys of the corrugations in the tubing. Also, the grooves 17—17 are spaced apart in accordance with the spacing desired in the finished tubing; i. e., the grooves are spaced closer than were the corrugation forming ridges 11 on the deposition form 10. The grooves 17—17 are separated by upstanding circumferential ridges 18—18 which preferably project only slightly above the normal surface of the mandrel 16 and accordingly do not fill the corresponding corrugations in the rubber deposit placed thereover as the corrugations are relatively higher than the ridges. It will usually be desirable to provide a shallow venting groove 19 extending generally lengthwise of the form across the circumferential grooves and ridges for the purpose of venting air and gases during the vulcanization hereinafter described.

As above indicated, the contracted and dried rubber deposit (Fig. 4) is transferred to the shaping mandrel 16 where it is disposed in substantially the desired final configuration with the valleys of the corrugations associated with the grooves in the mandrel (Fig. 5). However, since the spacing of the grooves 17—17 is greater than was the spacing of the corrugations during the preceding drying step, such disposition of the rubber deposit on the shaping mandrel will require some extension of the deposit lengthwise. This has been found to be highly desirable in providing a high degree of uniformity in the finished product. The shaping mandrel 16 with the rubber deposit properly disposed thereon is then placed in any conventional vulcanizing equipment, such as the conventional heating chamber 20 diagrammatically illustrated in the drawing (Fig. 5), and the rubber is vulcanized by heating in the usual manner. The duration of the heating, of course, will vary depending upon the particular composition of the rubber.

The final vulcanization of the rubber on the shaping form serves to set the rubber permanently in the desired final form. If vulcanized latex is used, such final setting of course will be effected by the drying step and no vulcanizing step will be required. The vulcanized or otherwise finally set rubber deposit is then stripped from the shaping mandrel to produce the finished corrugated rubber tubing as illustrated in Fig. 7.

The present invention for the first time enables the rubber manufacturer to produce highly uniform and satisfactory corrugated rubber tubing with closely spaced corrugations by means of dipping processes. It is accordingly possible to attain all the economies of dipping processes without sacrificing uniformity in the product.

The term "rubber" has been used throughout the specification and claims in a generic sense to include all natural and synthetic rubbers and rubber-like materials having the pertinent characteristics of natural rubber including flexibility, extensibility and capability of utilization in liquid form in dipping processes.

Numerous modifications and variations in details of the invention as hereinabove described may be made without departing from the spirit and scope of the invention as defined by the appended claims.

I claim:

1. A mandrel for use in the manufacture of circumferentially corrugated tubing and similar products, said mandrel comprising a generally cylindrical member having an external molding surface adapted to receive thereon a section of corrugated tubing, circumferential grooves in the external surface of the member, said grooves having rounded contours for receiving the valleys of the corrugations in the tubing, circumferential ridges interposed between the grooves, said ridges projecting less than the height of the corrugations in the tubing, and a venting groove extending across the circumferential grooves and ridges.

2. A mandrel for use in the manufacture of corrugated tubing and similar products, said mandrel comprising a generally cylindrical member having an external molding surface adapted to receive thereon a section of corrugated tubing, circumferential grooves in the external surface of the member for receiving the valleys of the corrugations in the tubing, circumferential ridges interposed between the grooves, and a venting groove extending across the circumferential grooves and ridges.

3. A mandrel for use in the manufacture of corrugated tubing and similar products, said mandrel comprising a generally cylindrical member having an external molding surface adapted to receive thereon a section of corrugated tubing, circumferential grooves in the external surface of the member for receiving the valleys of the corrugations in the tubing, and circumferential ridges interposed between the grooves, the grooves having rounded outlines and the ridges having flattened peaks to provide a sinuously undulated surface in which the peaks of the undulations are truncated substantially below the normal sinuous peak level, whereby corrugated tubing may be placed thereon with the valleys of the corrugations engaging the grooves without the peaks of the corrugations being filled by the ridges.

FOREST G. TRITT.